R. Onderdonk,
Apple Corer and Cutter.
Nº 52,740. Patented Feb. 20, 1866.

Witnesses:
Inventor:

UNITED STATES PATENT OFFICE.

ROBERT ONDERDONK, OF NEW YORK, N. Y.

APPLE CORER AND SLICER.

Specification forming part of Letters Patent No. 52,740, dated February 20, 1866.

*To all whom it may concern:*

Be it known that I, ROBERT ONDERDONK, of the city, county, and State of New York, have invented a new and Improved Machine for Slicing and Coring Apples; and I do hereby declare that the following is a full, clear, and exact description thereof, which will enable those skilled in the art to make and use the same, reference being had to the accompanying drawings, forming part of this specification, in which—

Figure 1:
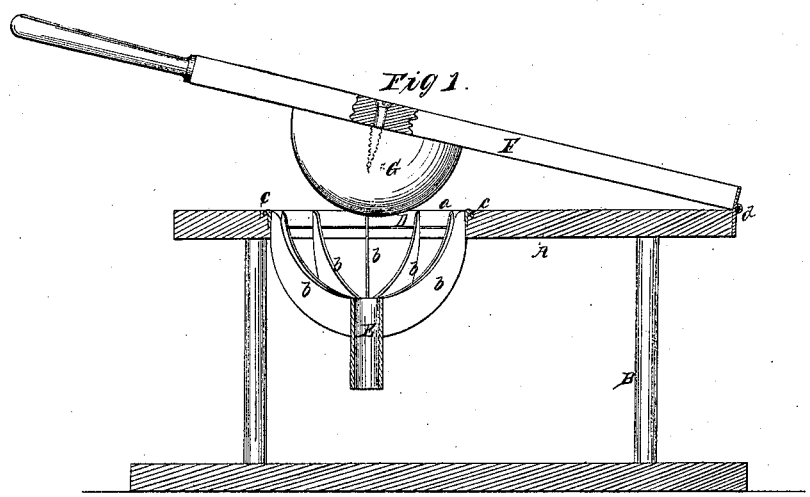
Figure 2:
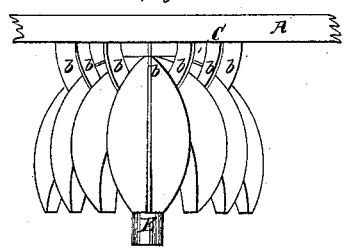
Figure 3:
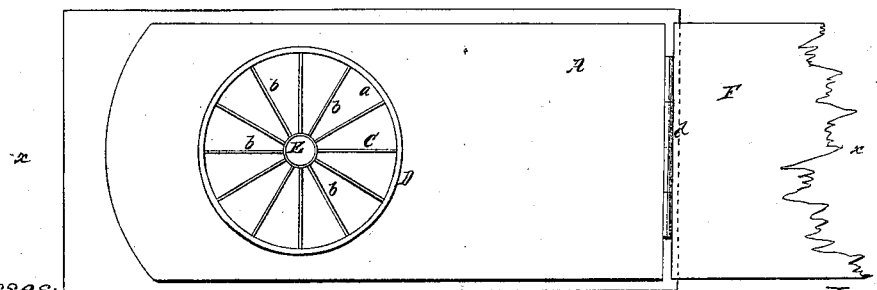

Figure 1 is a side sectional view of my invention, taken in the line $x\,x$, Fig. 3; Fig. 2, a detached view of the cutting device, showing an apple nearly sliced and cored; Fig. 3, a plan or top view of the invention.

Similar letters of reference indicate like parts.

This invention relates to a new and improved machine for slicing and coring apples; and it consists in having a series of slicing-cutters arranged so as to form the half of a hollow sphere, with a tubular coring-cutter at the lower end, the above cutting device being used, in connection with a semi-spherical plunger, to force the apple through the cutting device, all being arranged to operate as hereinafter set forth.

A represents a horizontal platform, which may be supported by any ordinary framing, B, said platform having a circular opening, $a$, made in it to receive the cutting device C. This cutting device is composed of a series of cutters, $b$, of curved form, each being nearly a quarter-circle, and attached at their upper ends to a ring or band, D, and at their lower ends to a tubular cutter, E.

The cutters $b$ are placed at equal distances apart, and they form a hollow semi-sphere, the ring or band D being fitted in the opening $a$ and provided with a flange, $c$, to fit in an annular groove around the opening $a$ in the upper surface of the platform, as shown in Fig. 1, the upper ends of the cutters $b$ being flush with the upper surface of the platform A.

F is a lever one end of which is connected, by a hinge or joint, $d$, to one end of the platform A. This lever has a semi-spherical plunger, G, attached to it of such dimensions that it may readily pass into the hollow semisphere formed by the cutters.

The device is used by inserting an apple in the hollow or cavity formed by the cutters, either the stem end or the opposite end being uppermost, and then pressing down the lever F, so that the plunger G will bear upon the apple and force it down through the cutting device, the cutters $b$ slicing the apple by radial cuts and the tubular cutter E taking out the core. The first apple thus sliced and cored is discharged from the cutting device by the succeeding apple, should the same be in a natural state with the skin on; but having been peeled, the slices fall and the whole apple is discharged by the action of the plunger, the succeeding apple acting only to force out the preceding core.

The semi-spherical form of the cutting device affords a socket to receive the apple, the latter being held in position while being cut, all slipping and imperfect cutting being therefore avoided; and a further advantage is obtained by said form in consequence of the cutters $b$ having a drawing cut, which renders the work comparatively easy.

Apple slicers and corers have been constructed with radial slicing-cutters and a coring-tube, but arranged with their cutting-edges in a plane, so that that there is no drawing cut nor any socket to receive the apple, which involves the necessity of a holder of some kind being used to retain the apple while being cut and some care being exercised in adjusting the apples to be cut. I do not claim, therefore, broadly, the employment or use of radial cutters with a central coring-tube for slicing and coring apples irrespective of the manner of arranging said cutters; but,

Having thus described my invention, I claim as new and desire to secure by Letters Patent—

1. The arranging of the slicing-cutters $b$ so as to form a hollow semi-spherical socket to receive and hold the apple while being cut, and to obtain a drawing or oblique cut, substantially as set forth.

2. The combination of the coring-cutter E, slicing-cutters $b$, semi-spherical plunger G, lever F, arranged to operate in the manner and for the purpose herein specified.

ROBERT ONDERDONK.

Witnesses:
M. M. LIVINGSTON,
WM. E. LYON.